United States Patent [19]

Demit

[11] 4,147,759

[45] Apr. 3, 1979

[54] METHOD OF MANUFACTURING β' SiALON COMPOUNDS

[75] Inventor: Joël Demit, Tarbes, France

[73] Assignee: Ceraver, Paris, France

[21] Appl. No.: 837,247

[22] Filed: Sep. 27, 1977

[30] Foreign Application Priority Data

Sep. 27, 1976 [FR] France ................................. 76 2008

[51] Int. Cl.$^2$ ...................... C01B 21/00; C01B 33/26
[52] U.S. Cl. ..................................... 423/327; 106/65; 106/73.4; 264/65
[58] Field of Search .............. 423/327; 106/73.4, 73.5, 106/65; 264/56, 65

[56] References Cited

U.S. PATENT DOCUMENTS 3,903,230  9/1975  Kamigaito et al. ................. 106/73.4
3,991,148  11/1976  Lumby et al. ................... 423/327 X

OTHER PUBLICATIONS

Oyama, Japan J. Appl. Phys. 11 (1972) pp. 760–761.
Jack et al "Nature Physical Science" vol. 238, Jul. 10, 1972, pp. 28–29.

Primary Examiner—Edward J. Meros
Attorney, Agent, or Firm—Sughrue, Rothwell, Mion, Zinn and Macpeak

[57] ABSTRACT

Method of manufacturing silicon nitrides with a general formula of $Si_{6-z}Al_zO_zN_{8-z}$, in which z is a number less than or equal to 2.8. Silicon nitride is made to react at a temperature higher than 1600° C. and in the finely divided state on aluminium oxynitride, and in the presence of an agent which generates gaseous silicon monoxide. Application to the manufacture of hard materials of high resistance to oxidation and to creep at high temperature.

12 Claims, No Drawings

METHOD OF MANUFACTURING β' SiAlON COMPOUNDS

The present invention relates to a method of manufacture of modified silicon nitrides corresponding to the general formula $Si_{6-z}Al_zO_zN_{8-z}$, in which z represents a number less than or equal to 2.8.

Compounds of this kind, which are often called in short β' SiAlON compounds, have already been synthesized by mixing alpha and/or beta silicon nitride with alpha and/or gamma alumina powder, or any other variety of these two compounds, then by reaction, at high temperature, with or without applying pressure, in contact with various added substances such as aluminium nitride intended to increase purity while reducing as much as possible the appearance of other phases such as a vitreous phase and the phase X defined by Oyama and Kamigaito, "Siliconnitride-alumina system sintered materials," Yogyo-Kuotai-Shi, 1972, 80 (924, 29-38/3-27-336). The high temperature generally lies between 1500° C. and 1800° C. In order to obtain a coherent hard product other additional substances can be used during the subsequent sintering of the SiAlON obtained. Such other additives can include magnesia, oxides of rare earths, various spinels and magnesium nitride.

However, no method yet succeeded in reducing the mass losses during synthesis to a very low ratio, nor in obtaining a single phase product with low porosity and which is crystallographically pure.

The present invention aims to overcome the above-mentioned disadvantages and to provide a method of manufacture of β' SiAlON causing only small losses of mass during the synthesis reaction and providing a single phase product with an open porosity of less than 2% and a density of greater than 90% of the theoretical density.

The method of the invention is characterized in that silicon nitride is made to react on aluminium oxynitride at a temperature greater than 1600° C. and in the finely divided state and in the presence of an agent which generates gaseous silicon monoxide.

It also preferably comprises at least one of the following characteristics:

The aluminium oxynitride is obtained by reaction of aluminium nitride and alumina at a temperature greater than 1600° C. and in the finely divided state.

Before the reaction, the aluminium nitride is crushed to raise its Blaine specific surface area to at least 10,000 cm²/g and the alumina is crushed to raise its Blaine specific surface area to at least 6000 cm²/g.

Modified silicon nitrides are manufactured without an applied load.

The compound which generates gaseous silicon monoxide is a powdered mixture of silicon nitride and of silica or of silicon nitride and alumina, or else a compound of silicon nitride and an oxide alone or mixed with metal silicon or the solid product of silicon and oxygen in relative proportions corresponding to those of the silicon monoxide.

With a view to manufacturing modified silicon nitride powder, the compound which generates the gaseous silicon monoxide is a mixture of silicon nitride and silica, preferably in equal proportions by weight.

The degree of pulverization of the silicon nitride and of aluminium oxynitride corresponds to a Blaine specific surface area of at least about 8000 cm²/g.

The modified silicon nitride powder is sintered at a temperature higher than 1600° C. in a neutral gas atmosphere.

The modified silicon nitride powder is crushed before sintering to raise its Blaine specific surface area to at least 13,000 cm²/g.

The modified silicon nitride powder is sintered in the presence of at least one compound which generates gaseous silicon monoxide.

The compound used to generate the gaseous silicon monoxide during sintering is a mixture of silicon nitride and alumina powder, preferably in equal proportions by weight.

The sintered modified silicon nitride is manufactured directly from the silicon nitride and aluminium oxynitride.

Although there is no intention to be limited to a theoretical interpretation of the effect of the use of aluminium oxynitride as a reagent, it seems that the losses of mass during the synthesis must result from the reaction on silicon nitride of alumina or another substance rich in oxygen, such as a spinel. This ensures a loss of silicon monoxide at reaction temperatures and the formation (with the use of alumina), of aluminium oxynitride and of aluminium nitride which are made soluble. Possibly, in some conditions, silica can appear. The advantage of the use of aluminium oxynitride results partially from the fact that the activity of alumina is less.

At the time of the reaction without an applied load in a free atmosphere, the use of aluminium oxynitride as a reagent alone is not sufficient to cancel completely the decompositions. It has been observed that in these conditions, it is necessary to maintain the reaction mixture under a partial pressure of silicon monoxide, in order to stabilize the solid solutions. This partial pressure of silicon monoxide must not however be too great, otherwise the alumina contained in the oxynitride could be stabilized, the dissolving thereof could be hindered and this could lead to a polyphase product. The same remark applies to the sintering of the β' SiAlON with a view to obtaining a coherent product.

According to a preferred embodiment of the invention, this result is obtained by effecting the reaction and sintering in the presence of a substance which generates gaseous silicon monoxide in the reaction conditions. This substance can be a mixture of silicon nitride and silica, preferably in equal proportions by weight. Also, it is possible to use a mixture of silicon nitride and of alpha alumina, of silicon oxynitride, a nitride of modified silicon having a composition corresponding to the β' SiAlON compounds, with various degrees of substitution, the product commercialized under the donomination "solid silicon monoxide", etc.

There are described hereinbelow by way of example, particular modes of manufacture of β' SiAlON compounds, in which the coefficient z of the formula $Si_{6-z}Al_zO_zN_{8-z}$ is less than 2.8.

EXAMPLE 1

Preparation of aluminium oxynitride:

202 g of aluminium nitride with a specific surface of 11,000 cm²/g according to the Blaine method, is dry mixed for 4 hours in a mixer having rubberized aluminium balls, with 798 g of alumina having a specific surface area of 7000 cm²/g according to the Blaine method. All the specific surface areas of powders which will be set forth hereinbelow have also been measured according to the Blaine method and this will therefore not be mentioned again hereinbelow.

The mixture is then heated for 6 hours at 1800° C. in a graphite furnace in an argon atmosphere at a pressure of 800 millibars. The reaction product is then powdered to a specific surface area of 5000 cm$^2$/g, then analysed by X-ray diffraction. It contains only saturated gamma aluminium oxynitride and a residue of aluminium nitride.

EXAMPLE 2

The operation of Example 1 is repeated, but using 335 g of the same aluminium nitride and the same quantity of 798 g of alumina. An analogous product is obtained.

EXAMPLE 3

Manufacture of $\beta'$ SiAlON powder:

257 g of silicon nitride with 90% alpha phase and with a specific surface area of 7000 cm$^2$/g is mixed for 16 hours in a trichloroethane medium in an alumina ball crusher with 43 g of aluminium oxynitride prepared according to Example 2. These proportions correspond to the formation of a $\beta'$ SiAlON with a substitution index of z equal to 0.84. At the end of the crushing, the powdered mixture has a specific surface area of 10,000 cm$^2$/g.

After drying, the mixture is disposed in an air-tight chamber in a crucible made of SiAlON and placed in a graphite resistance furnace. In the air-tight chamber of the furnace, there has also been disposed a source of gaseous silicon monoxide, constituted by a powdered mixture of equal parts by weight of silicon nitride and silica. After bleeding, the furnace is made to contain a nitrogen atmosphere. Synthesis is then carried out by heating at 1710° C. for 2 hours. After weighing, it will be observed that the loss in the furnace of the mixture is less than 2%.

The product obtained is analysed by X-ray diffraction. The diffraction shows that the product exhibits only the silicon nitride lines but that they are shifted towards small angles. This product is called $\beta'$ SiAlON. An approximate calculation of the crystalline parameters gives for this solid solution the coefficients:
a=7.63 Angstroms
c=2.93 Angstroms

EXAMPLE 4

A mixture of 257 g of silicon nitride at 90% of alpha phase, with a specific surface of 7000 cm$^2$/g is crushed by the same method as in example 3 with 35.83 g of aluminium oxynitride obtained according to example 1 and 7.17 g of aluminium nitride identical to that used in examples 1 and 2.

The crushing and the reaction are affected also as in example 3 and an analogous $\beta'$ SiAlON powder is obtained.

EXAMPLE 5

A mixture of 172.44 g of silicon nitride identical to that of examples 3 and 4 and 127.56 g of aluminium oxynitride obtained according to example 2 is crushed by the same method as in example 3 and 4. The aluminium/silicon ratio corresponds this time to a substitution index z of 2.52. The specific surface area of the powder obtained is 9000 cm$^2$/g. The mixture obtained is subjected to a treatment analogous to that of the examples 3 and 4, but at 1640° C. for 2 hours. The loss of weight is close to that observed in those examples. X-ray diffraction shows up only the peaks of a $\beta'$ SiAlON whose crystalline parameters are close to
a=7.67 Angstroms
c=2.97 Angstroms

EXAMPLE 6

Sintering of $\beta'$ SiAlON:

The SiAlON powder obtained according to example 3 is subjected to thorough crushing until it has a specific surface area of 14,000 cm$^2$/g. There is then incorporated thereto a binder liable to allow the forming thereof in a press, for example camphor dissolved in trichloroethane. Test bars are then pressed and the binder is removed by heating to about 300° C. Sintering is effected by suspending the test bars in the same closed receptacle as that used for the synthesis of $\beta'$ SiAlON, also containing a source of gaseous silicon monoxide, constituted by a powdered mixture of equal parts by weight of silicon nitride and alumina. The test bars are heated at 1710° C. for 6 hours in a nitrogen atmosphere.

The analyses made on the sintered test bars show that a single phase product has been obtained, having open porosity of less than 1% and a true density of 2.92%, this corresponding to 92% of the theoretical density.

EXAMPLE 7

The test bars obtained by incorporation of camphor in SiAlON Powder obtained by the operational method of example 5 and by removal of this binder are also sintered, but the sintering is effected at 1650° C. for 6 hours. The sintered test bars have an open porosity of less than 1% and a true density of 2.85, i.e. 91% of the theoretical density. They are constituted by single phase $\beta'$ SiAlON with crystalline parameters of:
A=7.67 Angstroms
c=2.98 Angstroms

EXAMPLE 8

Direct manufacture of sintered $\beta'$ SiAlON: Silicon nitride powder such as used in Example 2 and aluminium oxynitride obtained according to that example are thoroughly crushed, bringing them to respective specific surface areas of 17,000 cm$^2$/g and 14,000 cm$^2$/g, then they are mixed in an earthenware jar in the proportions and conditions of Example 3. The specific surface area of the mixture reaches 16,000 cm$^2$/g. The pressing binder (camphor dissolved in trichloroethane) is then incorporated therein and test bars are formed. After elimination of the binder, the test bars are sintered in an analogous manner to that described in Example 7. After the heat treatment, the test bars have an open porosity of less than 1% and a density of 2.96, i.e. 95% of the theoretical density. After analysis by X-ray diffraction, it is observed that the test bars are essentially made of $\beta'$ SiAlON whose crystalline parameters are:
a=7.67 Angstroms
c=2.98 Angstroms In this last example, due to the compacting and the fineness of the mixture, the partial pressure of silicon monoxide which during the treatment prevails on the outside of the compressed bar is not set up immediately inside the compressed bar; this avoids the occurence of a secondary alumina phase and allowing the synthesis of the $\beta'$ SiAlON compound and then the sintering thereof.

Although the methods which have just been described hereinabove seem preferable, it will be understood that various modifications can be made thereto without going beyond the scope of the invention, it being possible to replace some operations or some reactional compounds by others which would fulfill the same technical function.

The compounds according to the invention are liable to be put to the same applications, in particular as hard materials, as silicon nitride. They have the advantage over the latter of better resistance to oxidation from 1200° C. onwards and of a better resistance to creep at high temperature, this being about 0.12% at 1370° C. according to N. J. Osborne, "Creep testing of high temperature engineering ceramics," Proceedings of the British Ceramic Society, No. 25, May, 1975.

What is claimed is:

1. Method of manufacturing $\beta'$ SiAlON compounds corresponding to the general formula $Si_{6-z}Al_zO_zN_{8-z}$, in which z represents a number less than or equal to 2,8, wherein silicon nitride in a finely divided state is made to react at a temperature greater than 1600° C. with aluminum oxynitride in a finely divided state, without load, in the presence of gaseous silicon monoxide.

2. Method according to claim 1, wherein the aluminium oxynitride is obtained by reaction of aluminium nitride with alumina at a temperature greater than 1600° C. and in the finely divided state.

3. Method according to claim 2, wherein the aluminium nitride is crushed before the reaction to raise its Blaine specific surface area to at least 10,000 cm²/g and the alumina is crushed before the reaction to raise its Blaine specific surface area to at least 6000 cm²/g.

4. Method according to claim 1, wherein the gaseous silicon monoxide is generated by a solid agent selected from the group consisting of a mixture of silicon nitride and silica powders, a mixture of silicon nitride and of alumina powders, a compound of silicon nitride and an oxide, a compound of silicon nitride and of an oxide to which silicon metal has been added, and the solid product of silicon and oxygen having relative proportions corresponding to that of the silicon monoxide.

5. Method according to claim 4, wherein a mixture of silicon nitride and of silica powders is used to generate the gaseous silicon monoxide.

6. Method according to claim 1, characterized in that the finely divided state of the silicon nitride and of the aluminium oxynitride corresponds to a Blaine specific surface area at least equivalent to 8000 cm²/g.

7. Method to produce sintered $\beta'$ SiAlON compounds which comprises sintering the product of claim 1 in powder form at a temperature of greater than 1600° C. in the presence of nitrogen.

8. Method according to claim 7, wherein the $\beta'$ SiAlON compounds are crushed before sintering, to raise their Blaine specific surface area to at least 13,000 cm²/g.

9. Method according to claim 7, wherein the $\beta'$ SiAlON compounds are sintered in the presence of gaseous silicon monoxide.

10. Method according to claim 9, wherein a mixture of silicon nitride and alumina powders, in equal proportions by weight, is used to generate the gaseous silicon monoxide.

11. The method of claim 5 wherein the silicon nitride and silica powders are in equal parts by weight.

12. A method to produce sintered $\beta'$ SiAlON compounds which comprises carrying out the process of claim 1 for a length of time until the $\beta$ SiAlON compounds are sintered.

* * * * *

UNITED STATES PATENT AND TRADEMARK OFFICE
CERTIFICATE OF CORRECTION

PATENT NO. : 4,147,759
DATED : April 3, 1979
INVENTOR(S) : Joel DEMIT

It is certified that error appears in the above–identified patent and that said Letters Patent are hereby corrected as shown below:

IN THE HEADING:

Foreign Application Priority Data:

Delete "76 2008" insert -- 76 29 008 --

Signed and Sealed this

Twenty-sixth Day of June 1979

[SEAL]

Attest:

RUTH C. MASON
Attesting Officer

DONALD W. BANNER
Commissioner of Patents and Trademarks